(12) United States Patent
Dahlen

(10) Patent No.: US 6,567,411 B2
(45) Date of Patent: *May 20, 2003

(54) METHOD AND APPARATUS FOR CONTINUOUS NARROWCAST OF INDIVIDUALIZED INFORMATION OVER A DATA NETWORK

(75) Inventor: Robert L. Dahlen, Denver, CO (US)

(73) Assignee: Qwest Communications International, Inc., Denver, CO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/224,525

(22) Filed: Dec. 31, 1998

(65) Prior Publication Data

US 2001/0012299 A1 Aug. 9, 2001

(51) Int. Cl.[7] ............................................... H04L 12/28
(52) U.S. Cl. ...................... 370/401; 709/219; 707/523
(58) Field of Search ........................ 370/352, 354–356, 370/400, 401; 709/201, 219, 302, 231, 225, 223, 206; 707/4, 1, 523, 6, 9, 100, 501; 706/10; 345/327, 349; 348/7

(56) References Cited

U.S. PATENT DOCUMENTS

| | | | | |
|---|---|---|---|---|
| 5,371,532 A | * | 12/1994 | Gelman et al. ................. 348/7 |
| 5,404,505 A | | 4/1995 | Levinson ..................... 707/10 |
| 5,727,129 A | * | 3/1998 | Barrett et al. .................. 706/10 |
| 5,740,549 A | | 4/1998 | Reilly et al. ................... 705/14 |
| 5,796,945 A | | 8/1998 | Tarabella ..................... 709/219 |
| 5,838,682 A | * | 11/1998 | Dekelbaum et al. ......... 370/401 |
| 5,862,325 A | * | 1/1999 | Reed et al. .................. 709/201 |
| 5,987,454 A | * | 11/1999 | Hobbs ............................ 707/4 |
| 5,991,306 A | * | 11/1999 | Burns et al. ................. 370/429 |
| 6,005,561 A | * | 12/1999 | Hawkins et al. ............. 345/327 |
| 6,012,088 A | * | 1/2000 | Li et al. ....................... 709/219 |
| 6,029,182 A | * | 2/2000 | Nehab et al. ................ 707/523 |
| 6,044,403 A | * | 3/2000 | Gerszberg et al. ........... 709/225 |
| 6,065,058 A | * | 5/2000 | Hailpern et al. ............. 709/231 |
| 6,125,384 A | * | 9/2000 | Brandt et al. ................ 709/302 |
| 6,169,989 B1 | * | 1/2001 | Eichstaedt et al. .......... 707/100 |

OTHER PUBLICATIONS

MDS PushCaster http://www.mds.interprise.com/pushcaster/q_and_a.html; (Nov. 17, 1998).

* cited by examiner

Primary Examiner—Hassan Kizou
Assistant Examiner—John Pezzlo
(74) Attorney, Agent, or Firm—Marsh Fischmann & Breyfogle LLP (57) ABSTRACT

A method and apparatus which narrowcasts individualized information to system users with access to a data network which carries information such as broadband video data, voice data, or other types of equivalent data such as the Worldwide Web. Connected to the data network is a push server which includes a memory which holds information related to various system users. Included in the memory are user ID, password, as well as a listing of the types of information which the system user wishes to receive. Also connected to the data network are various data sources which provide various types of information. For example, one source of information may be a report server which on a periodic basis provides report information. Another type of information may be from an alarm server which in real time provides alarms and associated relevant information. The system accesses and retrieves information from these sources. The information is converted to a common format which in turn is provided to the push server. The server may further bond other relevant information to the system user's preferences. The data preferences may include information which relates to the system user alone, such as monitoring information for the system user's own systems or components. The push server then narrowcasts this information out over the data network to the system user which has requested the information.

20 Claims, 8 Drawing Sheets

METHOD AND APPARATUS FOR CONTINUOUS NARROWCAST OF INDIVIDUALIZED INFORMATION OVER A DATA NETWORK

FIELD OF THE INVENTION

The present invention relates to a method and apparatus for narrowcasting information over a data network, and more specifically to continuously narrowcasting information to system users based upon selections made by the system users and additional information bonded thereto.

BACKGROUND OF THE INVENTION

Data networks, such as the Worldwide Web, have become a highly used medium for the transfer of information. Anyone with a personal computer, a connection to the Worldwide web, and a web browser may establish a connection with various sites located therein. In the current state of technology, a system user will obtain information from a website through use of pull technology. That is, when a system user clicks on a link on the website, the web browser sends a request to the Web server on which the site is located asking for the relevant page. Once access is provided to the page, the web browser downloads and displays the page.

A number of companies or service providers have recognized the value of providing websites which their customers may access in order to view information relating to products or services. In particular, a website may provide timely information relating to the current state of a company's system which a customer wishes to employ. One example may be a company which provides Frame Relay Network Services. A Frame Relay Network provides logical connectivity between geographically distributed devices, using special circuits, which can be multiplexed over a single access path. The Frame Relay Network may consist of two parts. The first part includes customer sites which have customer premise equipments (e.g., routers, bridges, frame relay access devices) that are connected to a Frame Relay Service. The configuration and management of such devices are the responsibility of the customer. The second portion belongs to the frame relay service provider, which has a network of switches, commonly housed in central offices, and are connected using internodal trunks supplied by the service provider. This network of switches and trunks is typically managed and provisioned by the service provider at their own network's operation center.

A number of different factors may affect the performance of the Frame Relay Network. The service provider typically collects and analyzes information relating to the operation of their part of the Frame Relay Network. Those customers which transmit information over this network may from time to time wish to view status information relating to the operation of the Network.

Currently, a customer may be required to call a customer service representative at the Frame Relay Service provider or connect to the Frame Relay Service provider's Website in order determine events and view their data and reports. In the event a connection is established with the website, the customer, using a web browser, must pull information relevant to the Network operation to its user interface for viewing. Every time a further update is desired, another connection must be established with the website. If a customer wishes to view information from a number of different sources it may require establishing connections with a number of websites or talking to a customer service representative.

SUMMARY OF THE INVENTION

The inventor has recognized that it may be advantageous for customers or other system users with access to a data network which carries information such as broadband video data, voice data, or other types of equivalent data, such as the Worldwide web, to receive information through a narrowcast over the data network rather than going through the process of accessing a Website and manually pulling this information to their user interface. A narrowcast "push" strategy would allow system users to automatically and continuously receive individualized real-time information about various equipment or services as well as any other selected public network data. The inventor has further recognized that the information may be narrowcast to system users based on their personal preferences and that this information may be further bonded to other relevant information. Still further, these personal preferences may relate to information to which is unique to the system user, such as monitoring information for systems which the system user either owns or has exclusive control over.

The system described herein, may include a narrowcast server device connected to a data network, where the narrowcast server device includes the functionality to narrowcast information to system users which have established a connection over the data network with the server device. Narrowcast is the functionality to transmit information over the data network and have it be received by only the party it was intended for.

Included within the narrowcast server or a memory device attached thereto, may be a list of system users with authorization to receive information from the server. Each entry may include information as to an address for narrowcasting the information as well as the types of information which the system user wishes to receive. Connected to the server either through a hard connection or over the data network, is at least one source of information. The source of information may be at least one other data server with a connection to the data network. Communication between objects located on the servers may be made possible through use of a common programming language such as Java. The data server may also include a conversion device for converting data stored on the data server to a common format for presentation to the system users.

In one aspect of the invention, the system users with access to the server, employ a user interface which includes the functionality to establish a connection with the data network. In order to establish a connection with the server, the system user may employ a web browser with a specially adapted plug-in or a separate data network aware application to receive the types of information narrowcast from the server. The user interface also includes a memory device for storing information which has been narrowcast.

In another aspect of the invention, the system users may have access to the information stored on the data server, provide a list of preferences for the types of information which they wish to receive via a narrowcast over the data network from the server. This list of data preferences along with a system user address and validation code may be stored within the memory device of the server. The server may further bond other relevant information to the system user's preferences. The data preferences may include information which relates to the system user alone, such as monitoring information for the system user's own systems or components.

When a system user establishes a connection with the server via the data network, the list of preferred information for the system user may be retrieved from the memory device and the data preferences analyzed. At this point, the server locates and establishes a connection with the information servers which upon which the selected information may be located. Once connection is established with the identified data servers, the server may be directed to retrieve the selected information for narrowcast to the particular system user. Upon location of the information, a conversion process may be performed to convert the selected data to a common format. Using the address of the system user, the server then narrowcasts the selected information over the data network to the system user. The applications included in the system user's interface may then provide the capability to receive and display this selected information. Functionality may further be included in the system user's interface to, based on selections made from the displayed information, retrieve further related information via the data network.

In yet another aspect of the invention, at least one of the data servers may be an alarm server. The alarm server may include a connection to an alarm notifier which may receive alarm information relating to the services or system being monitored. In real time, the alarm server may convert alarm information received from the alarm notifier to a common format and then push this alarm information to the server. The server may then push this information substantially immediately to all authorized system users with a current connection to the server and have selected to receive this alarm information.

In yet another aspect of the invention, the information servers include a report server, which when accessed by the server, provides report information relating to the service or system being monitored. The report information generated may also cover any other subject areas desired. Upon initial access by the server, the report server provides critical information for the system users currently logged into the system. A conversion process may be performed on this information to convert it to a common format. The converted report information may then be provided to the server, where it is narrowcast to the system users with a current connection to the server and have selected to receive this information. On a periodic basis, the report server may provide further reports to the server which are then pushed on to the system users.

Numerous modifications and additions will be apparent to those skilled in the art upon further consideration of the invention.

DETAILED DESCRIPTION

Figure 1:
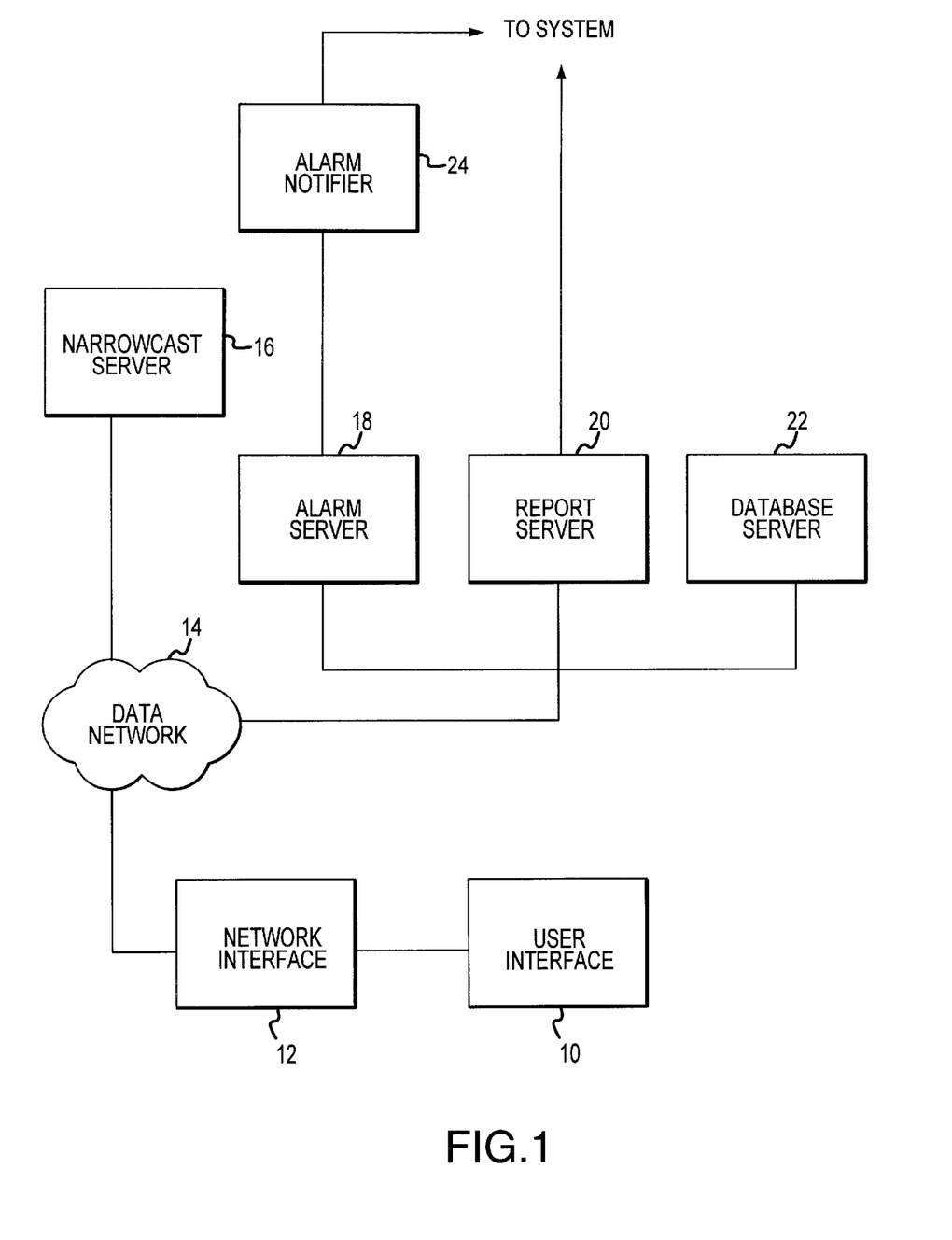
FIG. 1 discloses a diagram of the continuous narrowcast system incorporated into a data network.

Disclosed in FIG. 1 is a system diagram for an embodiment of the invention. The continuous narrowcast system described herein may be implemented on any number of data networks. For example, in the system shown in FIG. 1, communication between the particular elements of the system, are provided through a data network 14. The data network 14 may be any system which carries information such as broadband video data, voice data, or other types of equivalent data. One example of such a data network may be the Worldwide Web or any networks which may evolve therefrom. The system may also be implemented in a Intranet-type data network wherein communication is provided between a predefined number of nodes in a closed data network. In order to employ the system described herein, a system user may gain access to the data network through operation of a user interface. This user interface 10 may be a personal computer with an internal memory and a modem. A connection to the data network 14 may be provided through the network interface 12. This connection may be established through use of phone lines to an internet service provider (ISP), or it may be a established as a backbone connection to a local area network (LAN). As described above, the network interface 12 provides a connection to the data network 14, which includes a number of different websites which the system user through use of a web browser may establish contact.

Shown in FIG. 1 are a number of servers which are part of the data network and perform a variety of different functions. The server 16 may be implemented as a UNIX or other type server known in the art which is directly connectable to the data network. Incorporated into the server 16 is the functionality to narrowcast information to individual system users. Narrowcast is the functionality known to those skilled in the art to transmit individualized information over the data network and have it be received by only the party it was intended for. The narrowcast server 16 also includes functionality to establish connections with a variety of devices connected to the data network. The internal elements and operation of the narrowcast server 16 will be described in greater detail below.

Also connected to the data network 14, are one or more information servers. Specifically described in FIG. 1 is alarm server 18, a report server 20, and a database server 22. One skilled in the art would realize that any number of sources of information may be accessed and that the inclusion of only three data servers in the embodiment disclosed herein is for description purposes only. The alarm server 18 is a network server maintained in order to store information relating to alarms and other urgent information which may be generated during the monitoring of a particular system or process. Connected to the alarm server 18 is a alarm notifier 24 which is in direct contact with the system being monitored. This alarm notifier updates the status of the alarm server when alarm information is received. Alarm information gathered from the system being monitored is stored in a database on the alarm server.

The report server 20 stores information relating to a number of periodic reports which may be generated for the system or process being monitored. This information is provided to the server from a remote location for the purpose of further dissemination. Upon request, the report server provides this information to the narrowcast server.

The database server 22 stores information from any other sources (other than the alarm server and the report server) which the system user may wish to have access to. Also included in the database server may be information about the system users. This information may include IP addresses and preferences for the types of data to be received.

Figure 2:
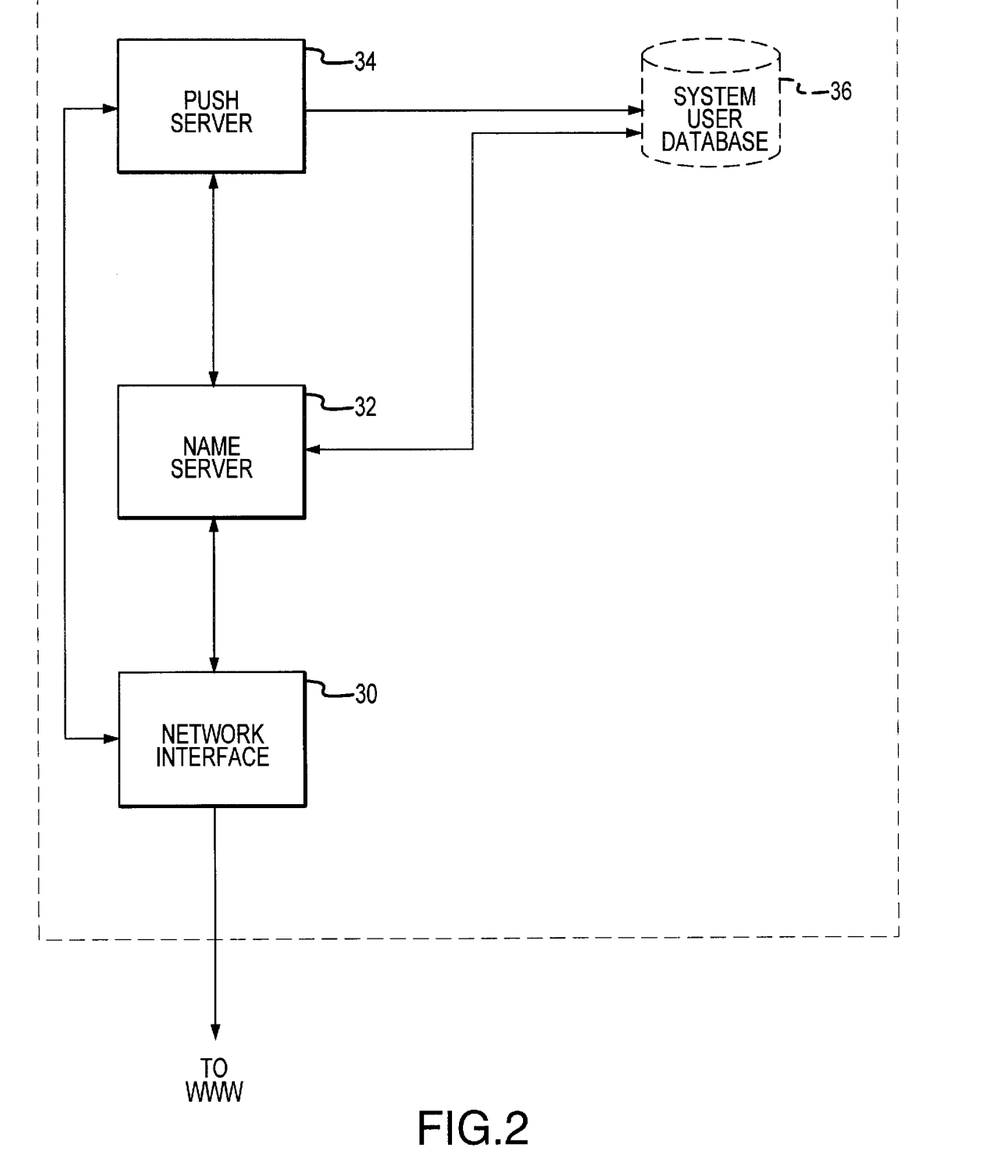
FIG. 2 discloses a system diagram for the server.

Disclosed in FIG. 2 is an internal system diagram for the narrowcast server 16. In order to establish a connection with the data network, a network interface 30 is provided. This interface provides for two-way communication over the data network with other devices. In connection with the network interface is name server 32. This name server provides the ability to locate system user information in the system user database 36. Database 36 is employed to store information about the system users who receive individualized information via a narrowcast. The information stored in this information may include system user name and IP address, as well as the types of information to be received.

When a system user subscribes to the narrowcast service described herein, various types of information are gathered. Other than the personal information which is used to transmit the information, a system user must make selections as to the information they wish to receive. The narrowcast server provides the functionality that when a particular source of data is chosen, additional relevant information may be bonded thereto. For example, if a system user wishes to receive notice of a particular alarm, a number of different sources of information may be accessed in order to provide all the relevant information. A system user may wish to know about the alarm itself, the trouble ticket generated for that alarm, and how recently and how often similar alarms have been set off. The bonding process automatically associates this information with the alarm when it is narrowcast to a particular system user.

The push server 34 provides the capability of retrieving information via the data network from a variety of information servers. Conversion capabilities are incorporated into the server to convert the information received from the remote source into a common format for transmission to the system users. Once all the information for a particular system user has been gathered and converted, the push server narrowcasts this information to the appropriate party. This process will be described in greater detail.

Figure 3:
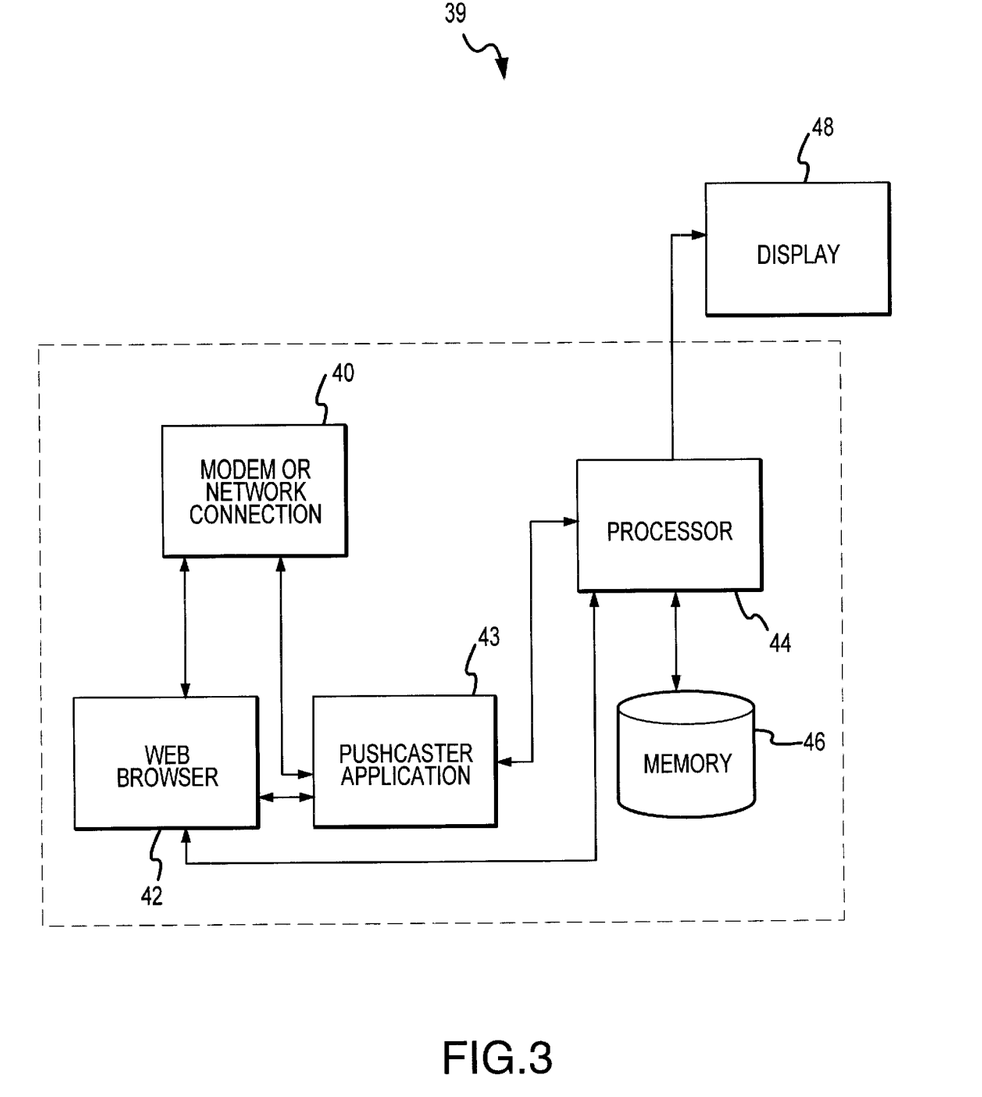
FIG. 3 discloses a system diagram for the typical user interface which establishes a connection with the data network.

Disclosed in FIG. 3 is an internal system diagram for the user interface 39 employed by the system user. In order for the present system to operate the user interface may include a number of components. The system user establishes a connection with the network interface through a device such a modem or network card 40. The modem allows for the connection via the telephone lines to an internet service provider (ISP). The network card allows the user to establish a connection with the data network through a local area network (LAN). Incorporated into the system is a Web Browser 42 of the type typically known in the industry (Netscape Navigator, Microsoft Explorer, . . . ) which allows the system user to contact a number of sites on the data network when a connection has been established. In the present invention, a narrowcast application is also included in the user interface which is specially adapted for receiving and preparing the information received during a narrowcast for display. This may be a software program which is installed on the user interface. In another aspect of the invention this narrowcast application may be incorporated as a plugin in the web browser. The narrowcast application may be employed as a screen server device which is continuously updated while a connection is established with the narrowcast server.

The narrowcast application is in connection with the processor 44 for the user interface. Memory 46 is also connected to the processor and may be used to store information received during the narrowcast. Once the narrowcast information has been properly processed, it is shown to the system user through display 48.

The system described herein employs a "push" strategy for making narrowcasts which allows system users to automatically and continuously receive real time, individualized information about particular topics. These topics may include such things as operational status of an on-site network, equipment (e.g., routers, switches, servers, PBXs, etc.) as well as any public network data provided by a communications carrier. Of particular note is that the information is accessed, bonded, and narrowcast to each system user individually. Further the information may relate to the system user's own facilities or equipment. For example, if a system user has a communications network which it wishes to continually monitor, access would first be provided to the system user's own databases. Through this access, information may be accessed and bonded based on the system users preferences. The information provided may be things such as what a carrier engineer views during system operation, such as bonded data (e.g., trouble tickets, other reports, graphs, etc. associated with particular events). Because of the narrowcast capability this information may be provided only to the system user because of its proprietary nature.

Figure 4:
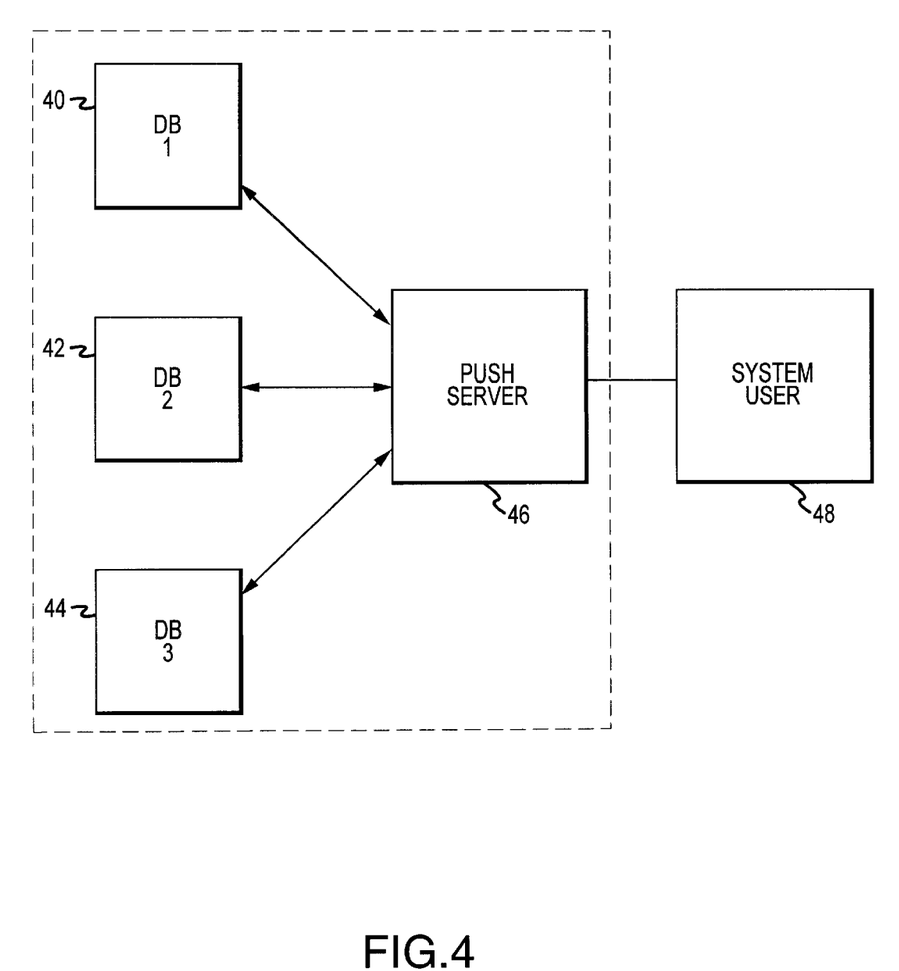
FIG. 4 discloses a simplified system diagram for the continuous narrowcast system.

The system described herein is designed to collect, narrowcast, and display data from a wide variety of sources in a consistent format. Furthermore, the system described herein makes information available in real time while maintaining a low cost. Disclosed in FIG. 4 is a simplified version of the system described herein. Information to be narrowcast is provided from data sources 40–44. When a customer establishes a connection with the push server 46, a search is performed for the system user to determine preferences for receiving information. Once this is determined, the appropriate database is contacted and a further search is performed within the databases to locate the requested data. The system user may receive information from more than one data source. Once the information is located, the data is formatted on the push server. This information is then narrowcast over the data network to the particular system user.

Figure 5:
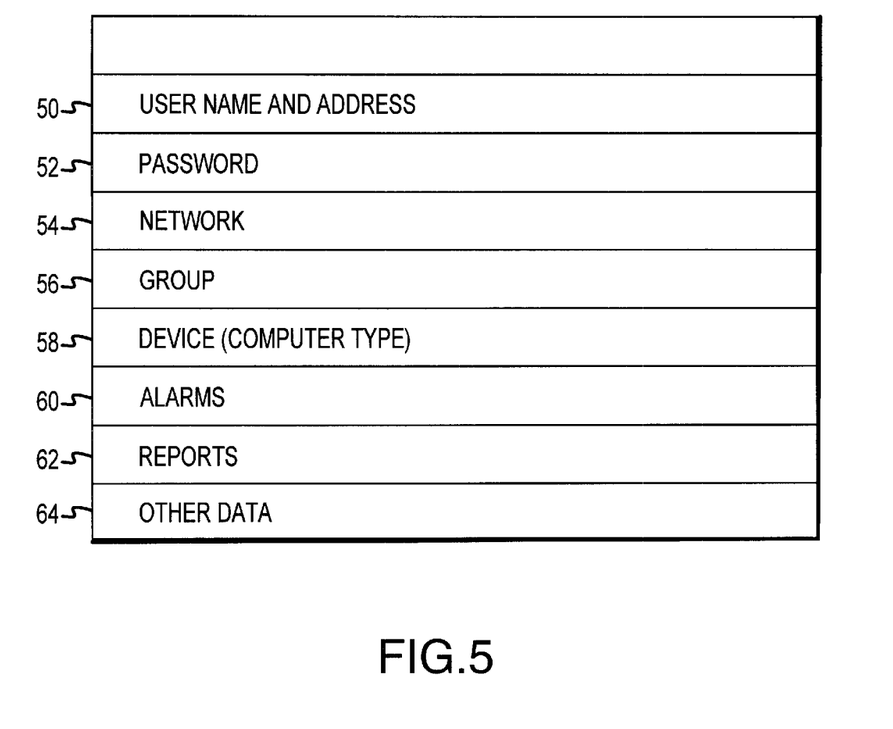
FIG. 5 discloses an example of a customer profile stored in the database of the server.

As described above, included within the narrowcast server is a database which includes entries for each system user that has subscribed to the narrowcasting system. Prior to implementation of the system, information is gathered as to the data preferences for each of the subscribing system users. The system users may choose to receive information from a variety of different sources which are accessible by the narrowcast server. These entries may be unique for each of the subscribers. Disclosed in FIG. 5 is an example of tabular listing stored in either database 36 or 22, which includes the relevant information for a single system user subscriber. This is the information which is accessed by the name server and then employed to make data selections from the remote data sources. Item 50 includes the user name and the IP address for transmitting information once it has been retrieved. Item 52 is a password which is checked when the system user logs in order to confirm that the system user is valid and that there is authorization to access particular sources of data. Item 54 describes the network in which the system user may be located. Item 56 describes the group. Item 58 describes the device, i.e. user interface, which the system user is employing. Different specifications are included as to the type of network connection which the system user is employing as well as the type of Web Browser which is used to access the narrowcast server.

The final entries as shown in the table in FIG. 5 include the types of information which the subscriber wishes to receive. Entry 60 covers the type of alarms, entry 62 covers the types of reports, and entry 64 covers every other types of data which may be received.

The user interfaces, the push server, the alarm server, the report server and the database server in the preferred embodiment of the application all communicate through use of Java applications. In particular, remote method invocation (RMI) which is a distributed object mechanism, is employed to facilitate communication. RMI provides the ability to seamlessly distribute Java objects across the Internet and Intranets. RMI enables objects in one Java virtual machine to seamlessly invoke methods on objects in a remote virtual machine. This allows moving behavior between clients and servers. A remote object implements one or more remote interfaces, which are shared Java interfaces that declare the methods of the remote object. A method invocation on a remote object has the same syntax as a method invocation on a local object.

To initialize RMI sessions, the client object looks up the server object via a naming service running on a given port. The naming service initiates a socket connection between the client/server for their communications. Once two objects are connected, they can pass references to other remote objects without using the naming service.

In order to initiate the system described herein, a system user will first establish a connection with the data network. At this point, the system user will look up the push server via a name server on the same post as the push server. This name server and push server may be behind a corporate firewall with Internet access available for clients to look up and communicate with the server. The actual object that the name server connects clients to will be an authObject that has a reference to the push server object.

The authObject has one interface: authorize (log in, password). The system users submit a log-in/password to the authObject, which looks up the log-in and password via the narrowcast server. If the system user is authorized, the authObject logs the client into the push server informing the server which data subset they are authorized to receive and returns the push server reference to the system user. All access to the push server goes through the authObject since this is the only remote object reference which the name server provides. Once the process begins, the push server will look up the alarm server, the report server and the database server via a name server on a different node. The narrowcast database server will be hosted with its own name server.

Once authorization is provided for the system user, the push server then establishes contact with the data servers. The push server receives reports from a report server 20. The report server updates its report state periodically (when report-engine has finished updating reports). It queries the narrowcast database for a list of narrowcast customers, the reports, and all the gifs and html documents that pertain to that customer. With this information, the report server reads these files and formats the data for consumption by the push server. Then the push server starts to initialize its report state by requesting the current reports from the report server. Then when the report server updates its report state, it in turn updates the push server's report state. The push server then pushes the reports out to the appropriate system user currently logged in. New system users that log in request the current reports for which they have authorized access and listen for report updates which are pushed to them via the behavior described above.

The push server receives alarm data from the alarm server 18. The alarm server behaves in a similar manner as to the report server described above. When the push servers starts, it initializes its alarm state by requesting the current alarm from the alarm server. As the alarm server is updated by the alarm notifier, it in turn updates the push server's alarm state which in turn pushes the alarm data out to the appropriate system users currently logged in. New system users request the current alarms for which they have authorized access and listen for alarm updates that are pushed to them via the following behavior: when the alarm server starts, it calls "show alarms" once to initialize its alarm state with the "set alarm" currently in the alarm database. Then, it listens for "sets" and "clears" from the alarm notifier to keep its alarm state synced up with the alarm database. The access of the information database server 22 operates a subset of the same manner as the servers described above.

As was described above, conversion of the retrieved information to a common format is performed by the narrowcast server 16. Once the information is transmitted to the system user's interface, the application or plug-in which has been incorporated into the Web Browser displays the information on the system user's display. Disclosed in FIG. 6 is an example of a screen display which may be employed by the present system.

Figure 6:
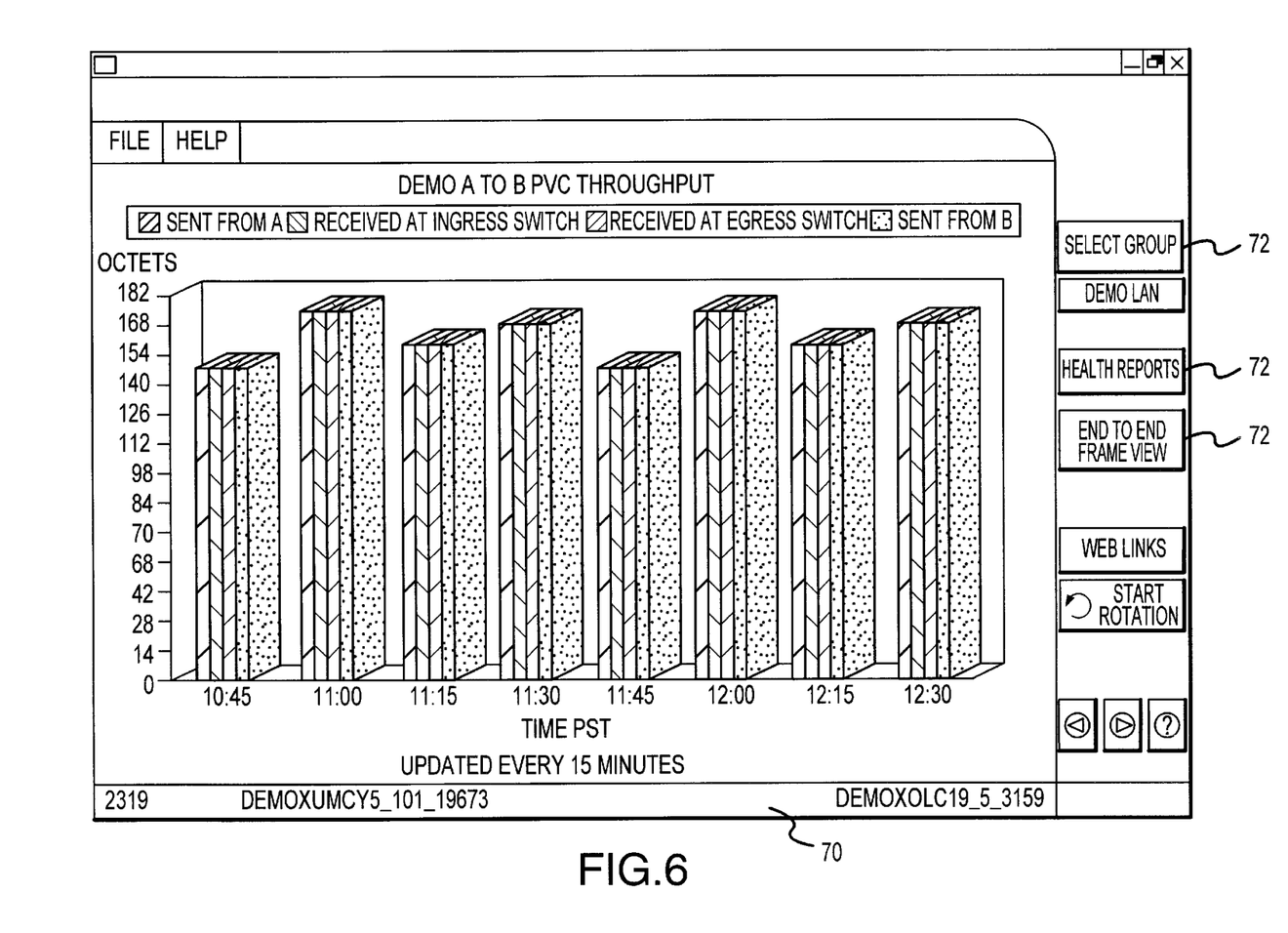
FIG. 6 discloses a example screen display which may be narrowcast to a system user.

In order to generate a screen display as disclosed in FIG. 6, a request has gone out to receive transmissions relating to the operation status of a Frame Relay Network. Frame relay monitoring is just being used as an example of the capabilities of the system, and one skilled in the art would know that the present system and method may be used to monitor any number of systems and components. In particular, information was requested for the number of octets counted at different points in the systems at different times of day. The conversions performed by the data servers allow the information to be converted to a common format for consistent viewing by the system users. As long as the system user stays connected, the information may be received on a realtime basis. The display shown in FIG. 6 may be used as a screen saver function.

Scrolling along the bottom of the screen shown in FIG. 6 are alarms 70 which are being narrowcast to the system user. Using a computer mouse, the system user may select one of these alarms and through the use of the web browser incorporated into the user interface additional information bonded to the alarms may be retrieved. This information may include trouble tickets generated for the alarm and historical information related to this alarm. The system user may also access additional information by selecting the buttons 72 which appear on the right side of the display. Selection of one of these buttons may change the type of information received or may retrieve information bonded to the data which is currently being displayed.

Figure 7A:
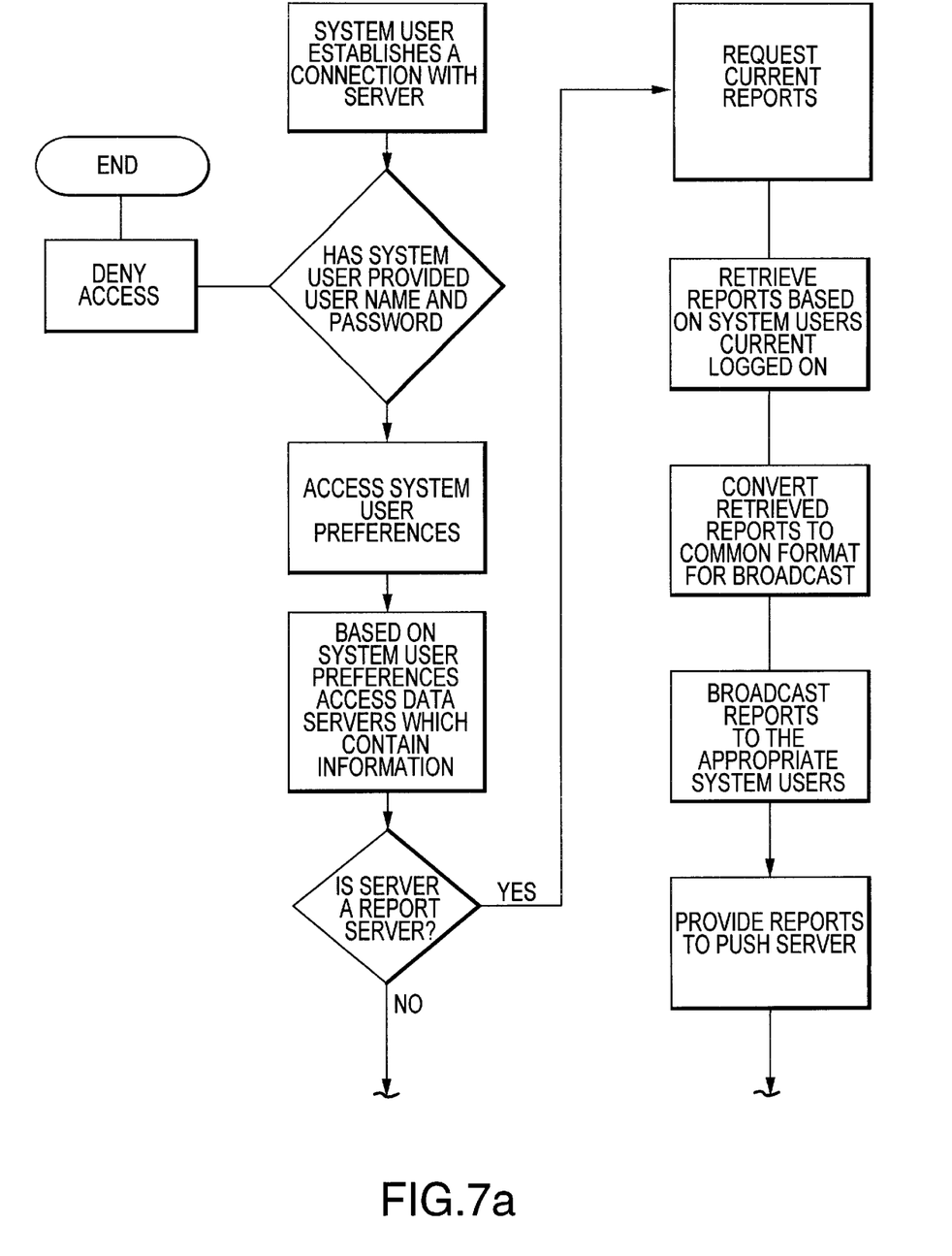
FIG. 7 discloses a flowchart which describes the operation of the system in greater detail.
Figure 7B:
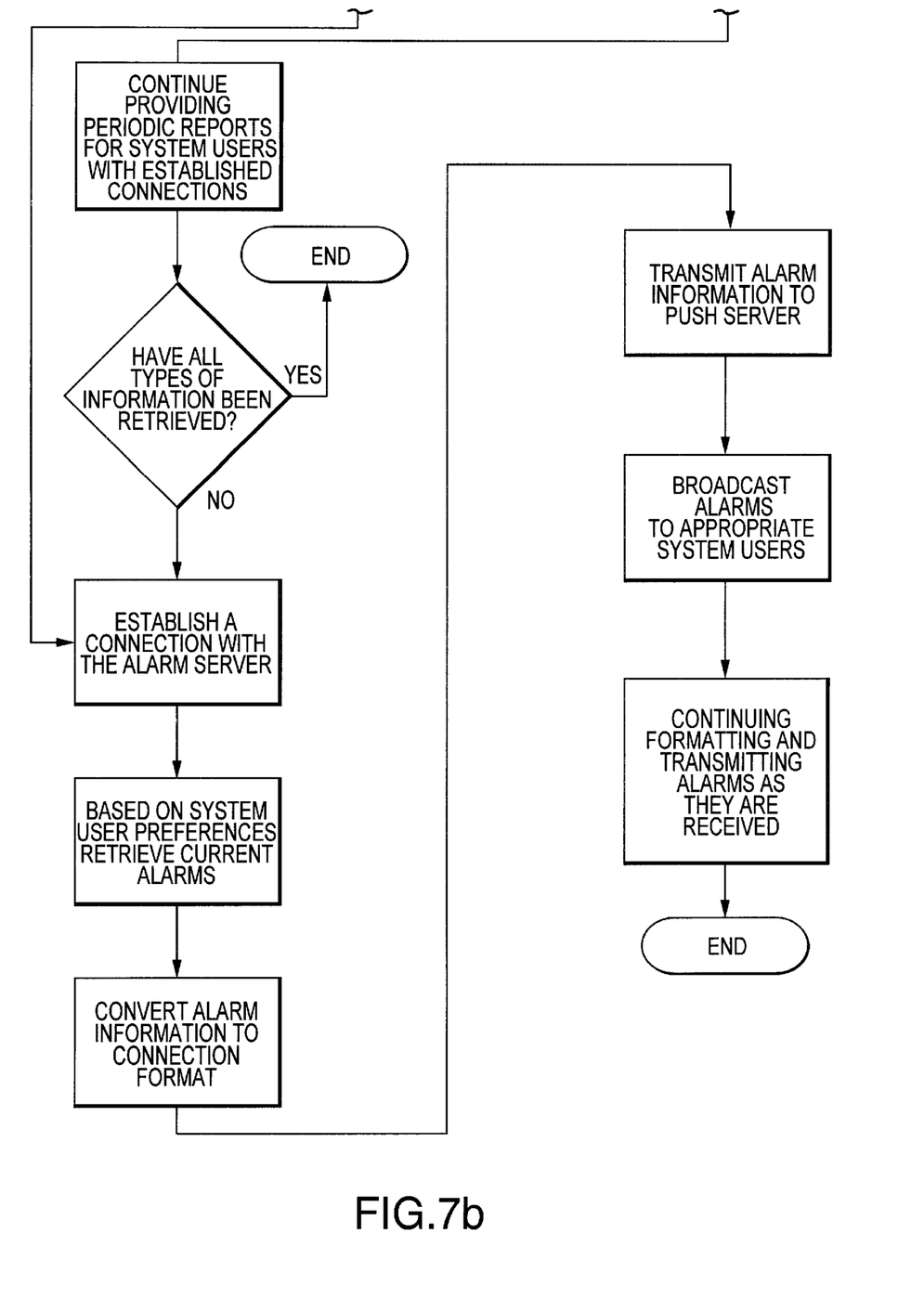

Disclosed in FIG. 7 is a flowchart which describes in detail the operation of the system described herein, especially in the situation where information is being requested for the current operation status of a Frame Relay Network. This flowchart describes the operation of the narrowcast after it has been activated and lines of communications have been established between the push servers and the various data sources. Initially, the push server detects the connection being established by the system user in order to gain access to the system. At this point, the name server requests the user name and password from the system user. Once this is provided the name server will access the push server database to retrieve detailed system user information. An analysis of this information will be performed to determine that the system user has provided the necessary password and that the system user is authorized to receive the information requested. If access is provided to the system, a analysis is performed of the system user's profile to determine what types of information are to be narrowcast to this particular system user. If there are multiple types of information to be received, a connection is established with the various information servers over the data network. Slightly different procedures are performed depending on whether the server accessed is a report server or an alarm server. If the report server is accessed, a request is first made for the current reports. At this point the report server generates the desired reports based on the system users which currently have access the system. A conversion process is then performed on the reports to put them in a common format. Once converted, these reports are then narrowcast to the appropriate system user(s). As long as the system user stays on the system reports are provided on a periodic basis. The application installed on the system user's interface then displays the information.

In the situation where a connection is established with an alarm server, a requests is made for the current list of alarms. Depending on which of the system users are to receive which alarms, the alarms are retrieved and converted to the common format. The alarms are then narrowcast to the system users currently logged on who have requested to receive this information. As further alarms are detected by the alarm notifier, this information is converted and then provided to the designated system users automatically.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A system for narrowcasting selected information to subscribers over a data network, comprising:
    a network interface device connectable to the data network which provides for two-way communication over the data network, where functionality is included in the interface device to detect when at least one subscriber is connected to the data network;
    a memory device connectable to said network interface device in which information preferences for the at least one subscriber may be stored and which is accessible to identify and retrieve the preferences for the at least one subscriber when the at least one subscriber is detected to be connected to the data network;
    at least one data storage device connectable to the data network which is configurable to receive information from remote systems and is searchable to provide data related to the preferences for the at least one subscriber; and
    wherein the data network interface device is configured to continually search and retrieve the data from the at least one data storage device, convert the data to a common display format, wherein the common display format Includes at least one interactive display which further includes at least one of: an interactive device for manipulating the interactive display and a user selectable device for retrieving and displaying bonded information, and continually narrowcast the formatted data over the data network to the at least one subscriber for as long as the least one subscriber Is connected to the data network.

2. The system of claim 1 wherein the data network is the worldwide web.

3. The system of claim 1 wherein the network interface device is a network server with push technology capability.

4. The system of claim 3 wherein the memory device is a database incorporated into the network server.

5. The system of claim 1 wherein the at least one data storage device includes at least one of: an alarm server accessible over the data network, a report server accessible over the network, and a database server accessible over the network.

6. The system of claim 5 wherein the alarm server includes an alarm notifier which receives alarm information and updates the alarm status of the alarm server, where the alarm server further provides alarm information in a predetermined format for narrowcast to the subscribers which have requested the alarm information.

7. The system of claim 5 wherein the report server receives report information and provides the report information in a predetermined format for narrowcast to the at least one subscriber which have requested the report information.

8. The system of claim 2 wherein the at least one subscriber establish contact with the interface device through use of a web browser.

9. The system of claim 2 wherein the data narrowcast to the at least one subscriber relates to operation of a frame relay network.

10. A method of providing selected information to at least one system user over a data network comprising the steps of:
    providing a least one source of information which includes information that is accessible over the data network;
    detecting connections established over the data network by the at least one of system user;
    scanning a system user database to identify preferences for data which the at least one system user with established connections wish to receive via a narrowcast over the data network;
    establishing a connection with at least one source of information, wherein the on source of information is configured to retrieve and store information from remote systems, and locating and formatting the selected types of information resident on the at least one source of information which relate to preferences for the at least one system user into a common display format, wherein the common display format includes at least one interactive display which further includes at least one of: an interactive device for manipulating the interactive display and a user selectable device for retrieving and displaying bonded information; and
    narrowcasting the formatted selected types of information over the data network to the at least one system user which have established connections based on the information identified in the system user database.

11. The method of claim 10 wherein the at least one source of information includes alarm information which is generated upon detection of an alarm state and the alarm information is provided to via the narrowcast to the at least one system user which have chosen to receive the alarm information upon the creation of the alarm information.

12. The method of claim 10 wherein the at least one source of information includes report information which is provided to the at least one system user which have chosen to receive the report information upon establishing a connection with the at least one source of information and then provided on a periodic basis thereafter.

13. The method of claim 10 wherein the narrowcast is performed using push technology for a data network.

14. The method of claim 10 wherein the data network is the Worldwide Web.

15. The method of claim 10 wherein the information provided by the at least one source of information is provided by the at least one system user.

16. The method of claim 10 further including the step of automatically bonding relevant information to the selected types of information for narrowcasting to the at least one system user.

17. The method of claim 16 wherein the relevant types of information include at least one of: trouble ticket information and historical information.

18. A system for narrow casting individualized information to at least one system user through a data network, comprising:

at least one source of information accessible through the data network, which provides information; and a server connectable to the data network comprising:

a memory which includes a listing of the at least one of system user and data preferences for each of the at least one system user;

a processor which accesses the at least one source of information and retrieves information relating to the data preferences;

a convertor which converts the information retrieved to a common format, wherein the common display format includes at least one interactive display which further includes at least one of: an interactive device for manipulating the interactive display and a user selectable device for retrieving and displaying additional selected data; and a narrowcaster which receives the converted information from the processor and narrowcasts it over the data network to the at least one subscriber.

19. The system of claim 18 wherein the processor automatically bonds relevant information retrieved from the at least one source of information with the information narrowcast to the at least one system user.

20. The system of claim 19 wherein the relevant data includes at least one of: trouble ticket data and historical information.

* * * * *